United States Patent
Harrison

(10) Patent No.: US 12,066,518 B2
(45) Date of Patent: Aug. 20, 2024

(54) GAN-BASED DATA SYNTHESIS FOR SEMI-SUPERVISED LEARNING OF A RADAR SENSOR

(71) Applicant: BDCM A2 LLC, Dover, DE (US)

(72) Inventor: Matthew Paul Harrison, Palo Alto, CA (US)

(73) Assignee: BDCM A2 LLC, Dover, DE (US)

( * ) Notice: Subject to any disclaimer, the term of this patent is extended or adjusted under 35 U.S.C. 154(b) by 660 days.

(21) Appl. No.: 17/163,191

(22) Filed: Jan. 29, 2021

(65) Prior Publication Data

US 2021/0255300 A1  Aug. 19, 2021

Related U.S. Application Data

(60) Provisional application No. 62/968,826, filed on Jan. 31, 2020.

(51) Int. Cl.
| | |
|---|---|
| *G01S 13/42* | (2006.01) |
| *G01S 17/89* | (2020.01) |
| *G06N 3/045* | (2023.01) |
| *G06N 3/08* | (2023.01) |

(52) U.S. Cl.
CPC ............ *G01S 13/426* (2013.01); *G01S 17/89* (2013.01); *G06N 3/045* (2023.01); *G06N 3/08* (2013.01)

(58) Field of Classification Search
CPC ........ G06N 3/045; G06N 3/08; G01S 13/426; G01S 13/584; G01S 13/865; G01S 13/867; G01S 13/878; G01S 13/931; G01S 17/89; G01S 17/931; G01S 7/417; G01S 7/4808
See application file for complete search history.

(56) References Cited

U.S. PATENT DOCUMENTS

| | | | |
|---|---|---|---|
| 2020/0192389 A1* | 6/2020 | ReMine | G06V 10/82 |
| 2020/0249314 A1* | 8/2020 | Eshet | G01S 7/417 |
| 2021/0132189 A1* | 5/2021 | Binzer | G01S 7/4052 |
| 2021/0271258 A1* | 9/2021 | Tran | G05D 1/0088 |

\* cited by examiner

*Primary Examiner* — Timothy A Brainard
(74) *Attorney, Agent, or Firm* — Dinsmore & Shohl LLP

(57) ABSTRACT

Examples disclosed herein relate to a method for semi-supervised training of a radar system. The method includes training a first radar network of the radar system with a first set of radar object detection labels corresponding to a first set of radar data, training a generative adversarial network (GAN) with the trained first radar network, synthesizing a training data set for a second radar network of the radar system with the trained GAN, training a second radar network with the synthesized training data set, and generating a second set of radar object detection labels based on the training of the second radar network.

20 Claims, 10 Drawing Sheets

GAN-BASED DATA SYNTHESIS FOR SEMI-SUPERVISED LEARNING OF A RADAR SENSOR

CROSS-REFERENCE TO RELATED APPLICATIONS

This application claims priority from U.S. Provisional Application No. 62/968,826, filed on Jan. 31, 2020, which is incorporated by reference in its entirety.

BACKGROUND

Autonomous driving is quickly moving from the realm of science fiction to becoming an achievable reality. Already in the market are Advanced-Driver Assistance Systems ("ADAS") that can automate, adapt, and enhance vehicles for safety and better driving. The next step will be vehicles that increasingly assume control of driving functions, such as steering, accelerating, braking, and monitoring the surrounding environment and adjusting driving conditions to, for example, avoid traffic, crossing pedestrians, animals, and so on, by changing lanes or decreasing speed when needed. The requirements for object and image detection are critical to enable the aforementioned enhancements, particularly to control and perform driving functions within a short enough response time required to capture, process and turn the data into action. All these enhancements are to be achieved in autonomous driving while ensuring accuracy, consistency and cost optimization for deploying in the vehicles.

An aspect of making this work is the ability to detect, identify, and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment. Therefore, there is a need for vehicular systems that provide improved dynamic, responsive, and intelligent functionality for autonomous driving.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Methods and apparatuses for implementing a Generative Adversarial Network ("GAN") for synthesizing a training data set for a radar sensor are disclosed. The radar sensor is a beam steering radar capable of generating narrow, directed beams that can be steered to any angle (i.e., from 0° to 360°) across a Field of View ("FoV") to detect objects. The beams are generated and steered in the analog domain, while processing of received radar signals for object identification is performed with advanced signal processing and machine learning techniques. In various examples, the beam steering radar is used in an autonomous vehicle equipped with multiple sensors (e.g., camera, lidar, etc.) and a multi-sensor fusion platform for better control of driving functions and a safer driving experience. Each sensor may be used to detect and identify objects with perception engines implemented with neural networks (e.g., deep learning networks). As described in more detail herein below, a first beam steering radar is trained in a supervised manner with a set of training labels to generate a first set of radar object detection labels. This first set of radar object detection labels is then used in a GAN to generate a synthesized training set to train a second beam steering radar with different characteristics from the first beam steering radar.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
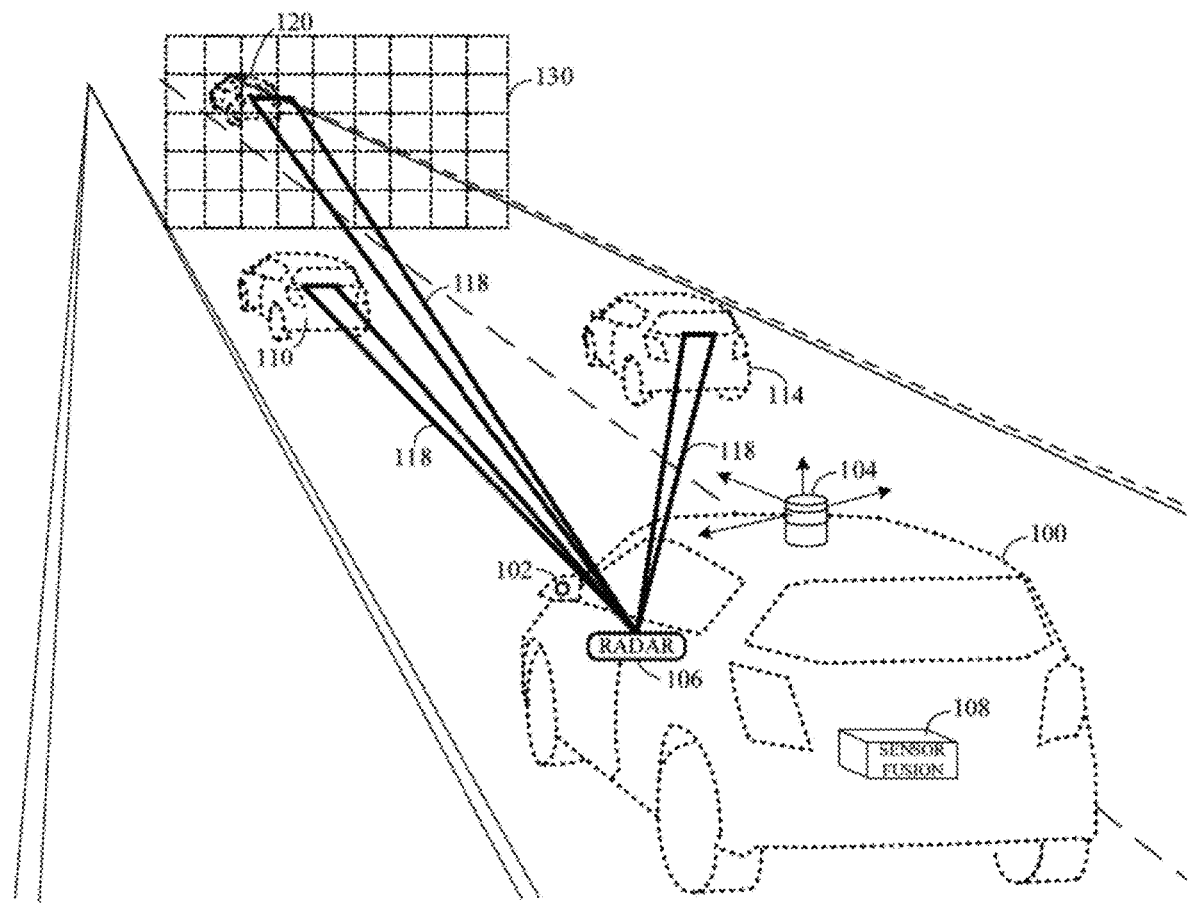
FIG. 1 illustrates an example environment in which a beam steering radar in an autonomous vehicle is used to detect and identify objects, according to various implementations of the subject technology.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100, but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras are able to capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in an FoV with at least one beam steering antenna and recognize objects quickly and with a high degree of accuracy over a long range of around 300 meters or more. The short-range capabilities of the camera 102 and the lidar 104 along with the long-range capabilities of the radar 106 enable a multi-sensor fusion module 108 in the ego vehicle 100 to enhance its object detection and identification.

As illustrated, the beam steering radar 106 can detect both vehicle 120 at a far range (e.g., greater than 350) m) as well as vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar ("LRR") mode that enables the detection of long range objects in a very short time to then focus on obtaining finer velocity resolution for the detected vehicles. Although not described herein, radar 106 is capable of time-alternatively reconfiguring between LRR and Short-Range Radar ("SRR") modes. The SRR mode enables a wide beam with lower gain, and yet can be configured to make quick decisions to avoid an accident, assist in parking and downtown travel, and capture information about a broad area of the environment. The LRR mode enables narrow, directed beams to reach long distances and at a high gain: this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
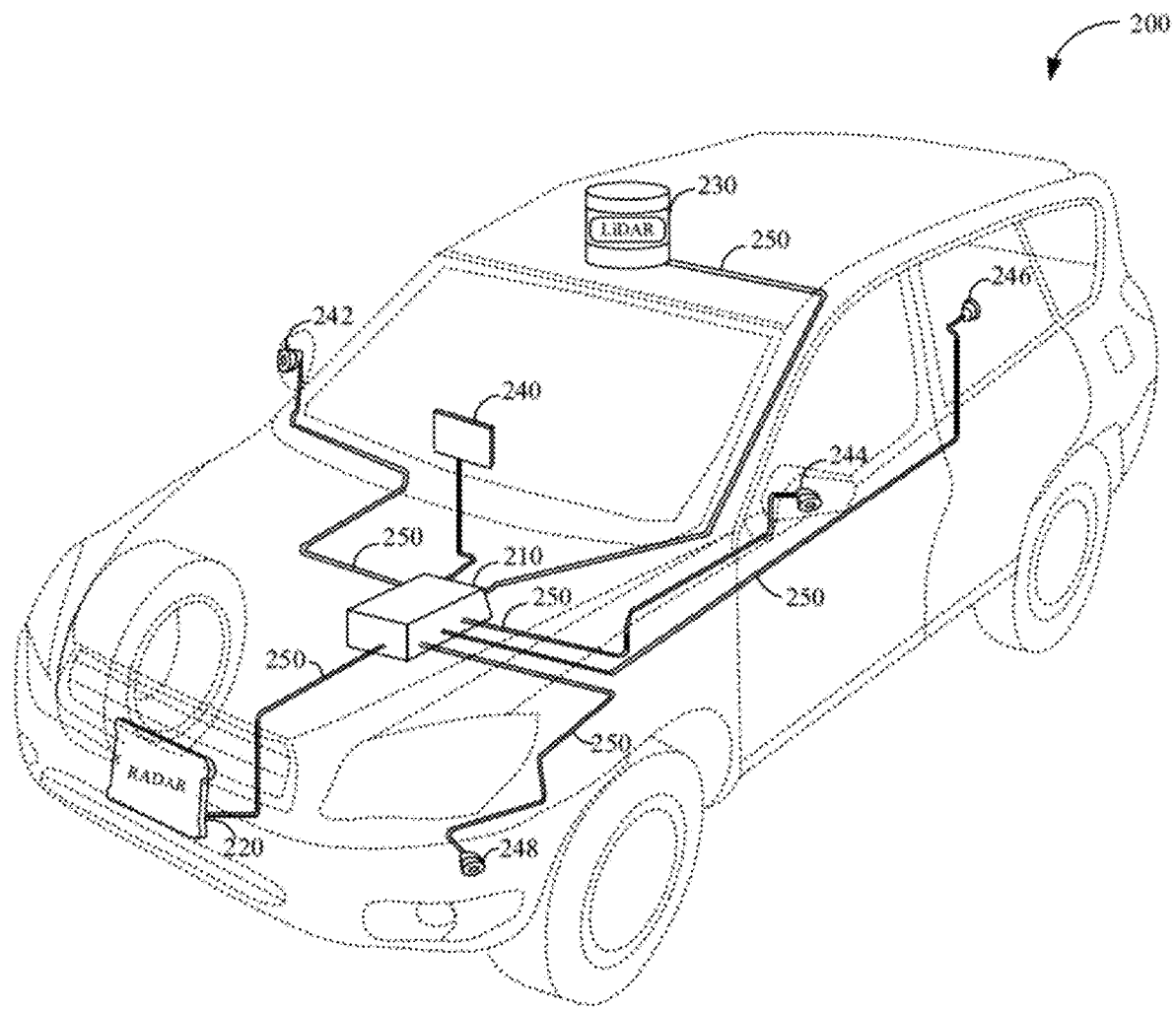
FIG. 2 illustrates an example network environment in which a radar system may be implemented in accordance with one or more implementations of the subject technology.

Attention is now directed to FIG. 2, which illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may include a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a lidar system having one or more lidar sensors, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet.

The electronic device 210) includes a multi-sensor fusion platform for processing data acquired by electronic devices 220, 230, 240, 242, 244, 246, and 248, including labeling objects detected and identified in the acquired data. Such objects may include structural elements in the environment near the vehicle such as roads, walls, buildings, road center medians and other objects, as well as other vehicles, pedestrians, bystanders, cyclists, plants, trees, animals and so on.

Figure 3:
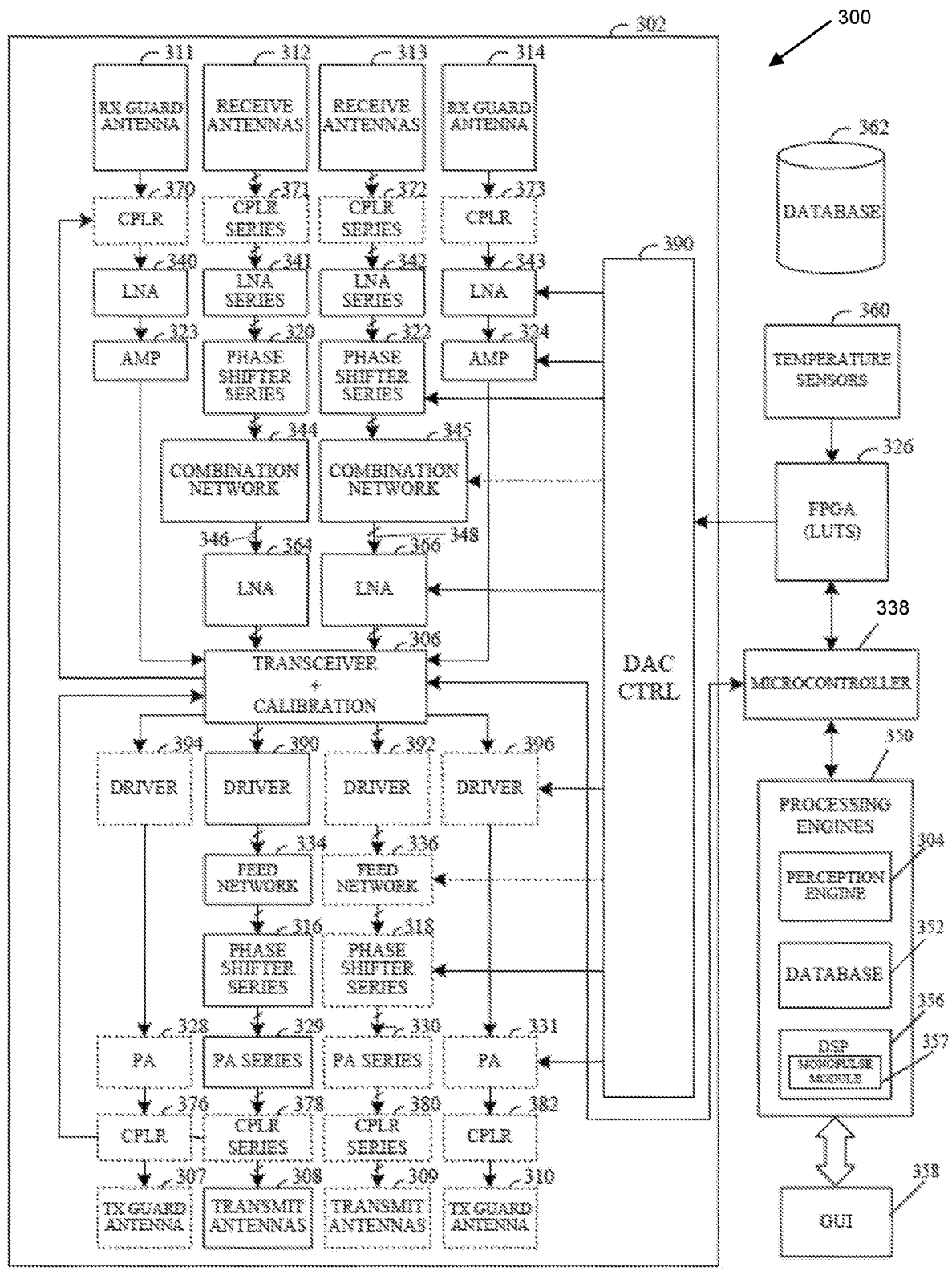
FIG. 3 is a schematic diagram of a beam steering radar system as in FIG. 2 and in accordance with one or more implementations of the subject technology.

FIG. 3 illustrates a schematic diagram of a beam steering radar system implemented as in FIG. 2 in accordance with various examples. Beam steering radar 300 is a "digital eye" with true 3D vision and capable of a human-like interpretation of the world. The "digital eye" and human-like interpretation capabilities are provided by two main modules: radar module 302 and a perception engine 304. Radar module 302 is capable of both transmitting RF signals within a FoV and receiving the reflections of the transmitted signals as they reflect off of objects in the FoV. With the use of analog beam steering in radar module 302, a single transmit and receive chain can be used effectively to form directional, as well as steerable, beams.

The receive chain includes receive antennas 312 and 313, receive guard antennas 311 and 314, optional couplers 370-373, Low Noise Amplifiers ("LNAs") 340-343, Phase Shifter ("PS") circuits 320 and 322, amplifiers (such as Power Amplifiers ("PAs")) 323, 324, 364 and 366, and combination networks 344 and 345. The transmit chain includes drivers 390, 392, 394 and 396, feed networks 334 and 336, PS circuits 316 and 318, PAs 328-331, optional couplers 376, 378, 380) and 382, transmit antennas 308 and 309, and optional transmit guard antennas 307 and 310. The radar module 302 also includes a transceiver 306, a Digital-to-Analog ("DAC") controller 390, a Field-Programmable Gate Array ("FPGA") 326, a microcontroller 338, processing engines 350, a Graphic User Interface ("GUI") 658, temperature sensors 360 and a database 362. The processing engines 350) includes perception engine 304, database 352 and Digital Signal Processing ("DSP") module 356. The DSP module 356 includes a monopulse module 357. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In operation, the transceiver 306 in radar module 302 generates signals for transmission through a series of transmit antennas 308 and 309 as well as manages signals received through a series of receive antennas 312 and 313. Beam steering within the FoV is implemented with PS circuits 316 and 318 coupled to the transmit antennas 308 and 309, respectively, on the transmit chain and PS circuits 320 and 322 coupled to the receive antennas 312 and 313, respectively, on the receive chain. Careful phase and amplitude calibration of the transmit antennas 308, 309 and receive antennas 312, 313 can be performed in real-time with the use of couplers integrated into the radar module 302 as described in more detail below. In other implementations, calibration is performed before the radar is deployed in an ego vehicle and the couplers may be removed.

The use of PS circuits 316, 318 and 320, 322 enables separate control of the phase of each element in the transmit antennas 308, 309 and receive antennas 312, 313. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 300 with a significantly longer detection range.

A major challenge with implementing analog beam steering is to design PSs to operate at 77 GHZ. PS circuits 316, 318 and 320, 322 solve this problem with a reflective PS design implemented with a distributed varactor network fabricated using suitable semiconductor materials, such as Gallium-Arsenide (GaAs) materials, among others. Each PS circuit 316, 318 and 320, 322 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 316, 318 and 320, 322 is controlled by an FPGA 326, which provides a series of voltages to the PSs in each PS circuit that results in a series of phase shifts.

The DAC controller 390 is coupled to each of the LNAs 340-343, the amplifiers 323, 324, 364, 366, PS circuits 316, 318, 320, 322, the drivers 390, 392, 394, 396, and the PAs 328-331. In some implementations, the DAC controller 390 is coupled to the FPGA 326, and the FPGA 326 can drive digital signaling to the DAC controller 390 to provide analog signaling to the LNAs 340-343, the amplifiers 323, 324, 364, 366, PS circuits 316, 318, 320, 322, the drivers 390, 392, 394, 396, and the PAs 328-331. In some implementations, the DAC controller 390 is coupled to the combination networks 344, 345 and to the feed networks 334, 336.

In various examples, an analog control signal is applied to each PS in the PS circuits 316, 318 and 320, 322 by the DAC controller 390 to generate a given phase shift and provide beam steering. The analog control signals applied to the PSs in PS circuits 316, 318 and 320, 322 are based on voltage values that are stored in Look-up Tables ("LUTs") in the FPGA 326. These LUTs are generated by an antenna calibration process that determines which voltages to apply to each PS to generate a given phase shift under each operating condition. Note that the PSs in PS circuits 316, 318 and 320, 322 can generate phase shifts at a very high resolution of less than one degree. This enhanced control over the phase allows the transmit and receive antennas in radar module 302 to steer beams with a very small step size, improving the capability of the radar system 300 to resolve closely located targets at small angular resolution. FPGA 326 also has LUTs to store bias voltage values for the LNAs 340-343. As described in more detail below, these bias voltage values can be determined during calibration to control the gain of the LNAs, including to vary the gain of LNAs connected to edge antenna elements of the receive antennas 312-313 in order to lower the side lobe levels of the received beams.

In various examples, each of the transmit antennas 308, 309 and the receive antennas 312, 313 may be a meta-structure antenna, a phase array antenna, or any other antenna capable of radiating RF signals in millimeter wave frequencies. A meta-structure, as generally defined herein, is an engineered structure capable of radiating electromagnetic waves in the mm-wave frequency range. Various configurations, shapes, designs and dimensions of the transmit antennas 308, 309 and the receive antennas 312, 313 may be used to implement specific designs and meet specific constraints.

The transmit chain in the radar module 302 starts with the transceiver 306 generating RF signals to prepare for transmission over-the-air by the transmit antennas 308 and 309. The RF signals may be, for example, Frequency-Modulated Continuous Wave ("FMCW") signals. An FMCW signal enables the radar system 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 306, the FMCW signals are fed to drivers 390 and 392. From the drivers 390 and 392, the signals are divided and distributed through feed networks 334 and 336, respectively, which form a power divider system to divide an input signal into multiple signals, one for each element of the transmit antennas 308 and 309, respectively. The feed networks 334 and 336 may divide the signals so power is equally distributed among them or alternatively, so power is distributed according to another scheme, in which the divided signals do not all receive the same power. Each signal from the feed networks 334 and 336 is then input to the PS circuits 316 and 318, respectively, where the FMCW signals are phase shifted based on control signaling from the DAC controller 390 (corresponding to voltages generated by the FPGA 326 under the direction of microcontroller 338), and then transmitted to the PAs 329 and 330. Signal amplification is needed for the FMCW signals to reach the long ranges desired for object detection, as the signals attenuate as they radiate by the transmit antennas 308 and 309. From the PAs 329 and 330, the FMCW signals are fed to couplers 378 and 380, respectively, to generate calibration signaling that is fed back to the transceiver 306. From the couplers 378 and 380, the FMCW signals are transmitted through transmit antennas 308 and 309. Note that couplers 378-380 are used only for real-time calibration purposes and are therefore optional. Note also that, in some implementations, the transceiver 306 feeds the FMCW signals to drivers 394 and 396, which are then fed to PAs 328 and 332 and to the couplers 376 and 382. From these couplers, the FMCW signals are fed to optional transmit guard antennas 307 and 310 for side lobe cancelation of the transmission signal.

The microcontroller 338 determines which phase shifts to apply to the PSs in PS circuits 316, 318, 320 and 322 according to a desired scanning mode based on road and environmental scenarios. Microcontroller 338 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 338 to adjust the scan parameters at a next scan to focus on a given area of the FoV or to steer the beams to a different direction.

In various examples and as described in more detail below, radar system 300 operates in one of various modes, including a full scanning mode and a selective scanning mode, among others. In a full scanning mode, the transmit antennas 308, 309 and the receive antennas 312, 313 can scan a complete FoV with small incremental steps. Even though the FoV may be limited by system parameters due to increased side lobes as a function of the steering angle, radar system 300 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 300 scans around an area of interest by steering to a desired angle and then scanning around that angle. This ensures the radar system 300 is to detect objects in the area of interest without wasting any processing or scanning cycles illuminating areas with no valid objects. Since the radar system 300 can detect objects at a long distance, e.g., 300) m or more at boresight, if there is a curve in a road, direct measures do not provide helpful information. Rather, the radar system 300 steers along the curvature of the road and aligns its beams towards the area of interest. In various examples, the selective scanning mode may be implemented by changing the chirp slope of the FMCW signals generated by the transceiver 306 and by shifting the phase of the transmitted signals to the steering angles needed to cover the curvature of the road.

Objects are detected with radar system 300 by reflections or echoes that are received at the receive antennas 312 and 313. The received signaling is then optionally fed to couplers 372 and 373 using feedback calibration signaling from the transceiver 306. The couplers 370, 372-374 can allow probing to the receive chain signal path during real-time calibration. From the couplers 372 and 373, the received signaling is fed to LNAs 341 and 342. The LNAs 341 and 342 are positioned between the receive antennas 312 and 313 and PS circuits 320 and 322, which include PSs similar to the PSs in PS circuits 316 and 318. For receive operation, PS circuits 320 and 322 create phase differentials between radiating elements in the receive antennas 312 and 313 to compensate for the time delay of received signals between radiating elements due to spatial configurations.

Receive phase-shifting, also referred to as analog beamforming, combines the received signals for aligning echoes to identify the location, or position of a detected object. That is, phase shifting aligns the received signals that arrive at different times at each of the radiating elements in receive antennas 312 and 313. Similar to PS circuits 316, 318 on the transmit chain, PS circuits 320, 322 are controlled by the DAC controller 390, which provides control signaling to each PS to generate the desired phase shift. In some implementations, the FPGA 326 can provide bias voltages to the DAC controller 390 to generate the control signaling to PS circuits 320, 322.

The receive chain then combines the signals fed by the PS circuits 320 and 322 at the combination networks 344 and 345, respectively, from which the combined signals propagate to the amplifiers 364 and 366 for signal amplification. The amplified signal is then fed to the transceiver 306 for receiver processing. Note that as illustrated, the combination networks 344 and 345 can generate multiple combined signals 346 and 348, of which each signal combines signals from a number of elements in the receive antennas 312 and 313, respectively. In one example, the receive antennas 312 and 313 include 128 and 64 radiating elements partitioned into two 64-element and 32-element clusters, respectively. For example, the signaling fed from each cluster is combined in a corresponding combination network (e.g., 344, 345) and delivered to the transceiver 306 in a separate RF transmission line. In this respect, each of the combined signals 346 and 348 can carry two RF signals to the transceiver 306, where each RF signal combines signaling from the 64-element and 32-element clusters of the receive antennas 312 and 313. Other examples may include 8, 26, 34, or 62 elements, and so on, depending on the desired configuration. The higher the number of antenna elements, the narrower the beam width. In some implementations, the receive guard antennas 311 and 314 feed the receiving signaling to couplers 370 and 374, respectively, which are then fed to LNAs 340 and 343. The filtered signals from the LNAs 340 and 343 are fed to amplifiers 323 and 324, respectively, which are then fed to the transceiver 306 for side lobe cancelation of the received signals by the receiver processing.

In some implementations, the radar module 302 includes receive guard antennas 311 and 314 that generate a radiation pattern separate from the main beams received by the 64-element receive antennas 312 and 313. The receive guard antennas 311 and 314 are implemented to effectively eliminate side-lobe returns from objects. The goal is for the receive guard antennas 311 and 314 to provide a gain that is higher than the side lobes and therefore enable their elimination or reduce their presence significantly. The receive guard antennas 311 and 314 effectively act as a side lobe filter. Similar, the radar module 302 may optionally include transmit guard antennas 307 and 310 to eliminate side lobe formation or reduce the gain generated by transmitter side lobes at the time of a transmitter main beam formation by the transmit antennas 308 and 309.

Once the received signals are received by transceiver 306, the received signals are processed by processing engines 350. Processing engines 350 include perception engine 304 that detects and identifies objects in the received signal with one or more neural networks using machine learning or computer vision techniques, database 352 to store historical and other information for radar system 300, and the DSP module 354 with an ADC module to convert the analog signals from transceiver 306 into digital signals that can be processed by monopulse module 357 to determine angles of arrival (AoA) and other valuable information for the detection and identification of objects by perception engine 304. In one or more implementations, DSP engine 356 may be integrated with the microcontroller 338 or the transceiver 306.

Radar system 300 also includes a GUI 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar system 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar system 300 to store radar and other useful data.

The radar data may be organized in sets of Range-Doppler Map (RDM) information, corresponding to four-dimensional (4D) information that is determined by each RF beam reflected from targets, such as azimuthal angles, elevation angles, range, and velocity. The RDMs may be extracted from FMCW radar signals and may contain both noise and systematic artifacts from Fourier analysis of the radar signals. The perception engine 304 controls further operation of the transmit antennas 308 and 309 by, for example, providing an antenna control signal containing beam parameters for the next RF beams to be radiated from the transmit antennas 308-309.

In operation, the microcontroller 338 may, for example, determine the parameters at the direction of perception engine 304, which may at any given time determine to focus on a specific area of an FoV upon identifying targets of interest in the ego vehicle's path or surrounding environment. The microcontroller 338 determines the direction, power, and other parameters of the RF beams and controls the transmit antennas 308 and 309 to achieve beam steering in various directions. Next, the transmit antennas 308 and 309 radiate RF beams having the determined parameters. The RF beams are reflected from targets in and around the ego vehicle's path (e.g., in a 360° field of view) and are received by the transceiver 306. The receive antennas 312 and 313 send the received RF beams to the transceiver 306 for generating the 4D radar data for the perception engine 304 for target identification.

In various examples, the perception engine 304 can store information that describes an FoV. This information may be historical data used to track trends and anticipate behaviors and traffic conditions or may be instantaneous or real-time data that describes the FoV at a moment in time or over a window in time. The ability to store this data enables the perception engine 304 to make decisions that are strategically targeted at a particular point or area within the FoV. For example, the FoV may be clear (e.g., no echoes received) for a period of time (e.g., five minutes), and then one echo arrives from a specific region in the FoV: this is similar to detecting the front of a car. In response, the perception engine 304 may determine to narrow the beam width for a more focused view of that sector or area in the FoV. The next scan may indicate the targets' length or other dimension, and if the target is a vehicle, the perception engine 304 may consider what direction the target is moving and focus the beams on that area. Similarly, the echo may be from a spurious target, such as a bird, which is small and moving quickly out of the path of the vehicle. The database 352 coupled to the perception engine 304 can store useful data for radar system 300, such as, for example, information on which subarrays of the transmit antennas 308 and 309 perform better under different conditions.

In various examples described herein, the use of radar system 300 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 300, the driver (or driverless vehicle) may maintain the maximum safe speed without regard to the weather conditions. Even if other drivers slow down, a vehicle enabled with the radar system 300 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 304 adjusts the focus of the RF beam to a larger beam width, thereby enabling a faster scan of areas where there are few echoes. The perception engine 304 may detect this situation by evaluating the number of echoes received within a given time period and making beam size adjustments accordingly. Once a target is detected, the perception engine 304 determines how to adjust the beam focus.

Figure 4:
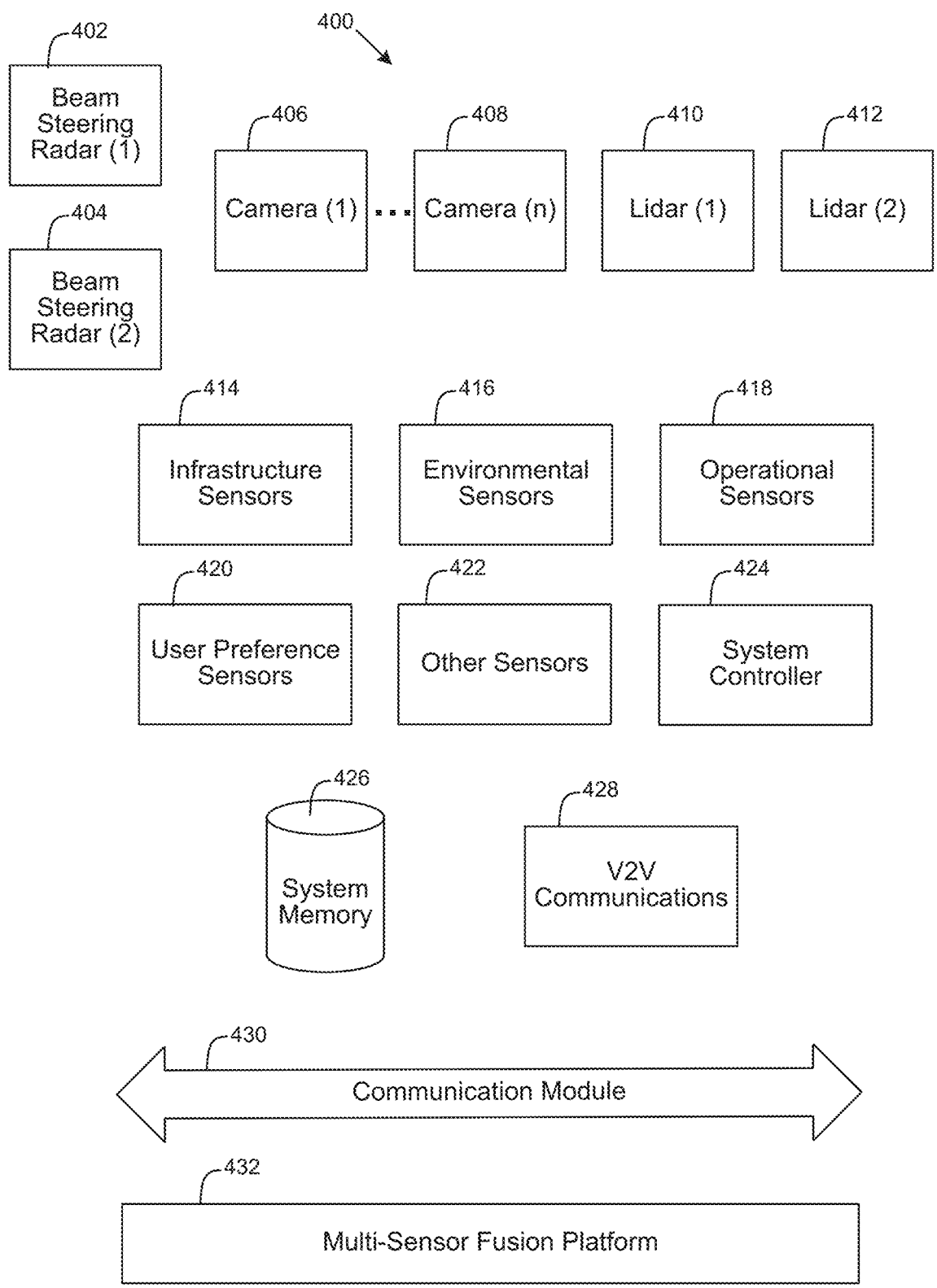
FIG. 4 is a schematic diagram of a multi-sensor fusion platform in accordance with various examples.

In various examples, beam steering radar 300 is used in an autonomous driving system that provides some or full automation of driving functions for an ego vehicle (e.g., ego vehicle 100 of FIG. 1) as illustrated in FIG. 4. The driving functions may include, for example, steering, accelerating, braking, and monitoring the surrounding environment and driving conditions to respond to events, such as changing lanes or speed when needed to avoid traffic, crossing pedestrians, animals, and so on. As shown in FIG. 4, the autonomous driving system 400 includes multiple sensors, such as beam steering radars 402-404, cameras 406-408, lidars 410-412, infrastructure sensors 414, environmental sensors 416, operational sensors 418, user preference sensors 420, and other sensors 422. The autonomous driving system 400 also includes a communications module 430, a multi-sensor fusion platform 432, a system controller 424, a system memory 426, and a Vehicle-to-Vehicle (V2V) communications module 426. It is appreciated that this configuration of autonomous driving system 400 is an example configuration and not meant to be limiting to the specific structure illustrated in FIG. 4. Additional systems and modules not shown in FIG. 4 may be included in autonomous driving system 400.

As illustrated, the autonomous driving system 400 has multiple camera sensors 406-408 positioned in different locations in the ego vehicle, such as cameras 242-248 of FIG. 2. The autonomous driving system 400 also has at least one lidar sensor to create a 360° 3D map of the environment represented as a point cloud. In various implementations, the system 400 has a lidar 408 that measures distances to objects detected and identified in the 3D map and a more sophisticated lidar 410 that is also able to measure the velocity of moving objects, such as a Frequency Modulated Continuous Wave ("FMCW") lidar.

In various examples, the beam steering radars 402-404 are implemented as beam steering radar 300 and include at least one beam steering antenna for providing dynamically controllable and steerable beams that can focus on one or multiple portions of a 360° FoV of the vehicle. The beams radiated from the beam steering antenna are reflected back from objects in the vehicle's path and surrounding environment and received and processed by a perception engine coupled to the beam steering radars 402-404 to detect and identify the objects and control the radar module as desired. The beam steering radars 402-404 may have different transceiver and DSP chips with different properties or different scan patterns. One or both radars may be in operation at any given time. In addition, both the camera sensors 406-408 and lidars 410-412 are also coupled to perception engines having neural networks capable of detecting and identifying objects in the acquired data.

Infrastructure sensors 414 may provide information from infrastructure while driving, such as from a smart road configuration, bill board information, traffic alerts and indicators, including traffic lights, stop signs, traffic warnings, and so forth. Environmental sensors 416 detect various conditions outside, such as temperature, humidity, fog, visibility, precipitation, among others. Operational sensors 418 provide information about the functional operation of the vehicle. This may be tire pressure, fuel levels, brake wear, and so on. The user preference sensors 420 may detect conditions that are part of a user preference. This may be temperature adjustments, smart window shading, etc. Other sensors 422 may include additional sensors for monitoring conditions in and around the ego vehicle.

In various examples, the multi-sensor fusion platform 432 optimizes these various functions to provide an approximately comprehensive view of the ego vehicle and environments. Many types of sensors may be controlled by the multi-sensor fusion platform 432. These sensors may coordinate with each other to share information and consider the impact of one control action on another system. In one example, in a congested driving condition, a noise detection module (not shown) may identify that there are multiple radar signals that may interfere with the vehicle. This information may be used by the perception engine coupled to the beam steering radars 402-404 to adjust the scan parameters of the beam steering radars 402-404 to avoid these other signals and minimize interference.

In another example, environmental sensor 416 may detect that the weather is changing, and visibility is decreasing. In this situation, the multi-sensor fusion platform 432 may determine to configure the other sensors to improve the ability of the vehicle to navigate in these new conditions. The configuration may include turning off the cameras 402-404 and/or the lidars 410-412 or reducing the sampling rate of these visibility-based sensors. This effectively places reliance on the sensor(s) adapted for the current situation. In response, the perception engines configure the sensors for these conditions as well. For example, the beam steering radars 402-404 may reduce the beam width to provide a more focused beam, and thus a finer sensing capability.

In various examples, the multi-sensor fusion platform 432 may send a direct control to the radars 402-404 based on historical conditions and controls. The multi-sensor fusion platform 432 may also use some of the sensors within the autonomous driving system 400 to act as feedback or calibration for the other sensors. In this way, the operational sensors 418 may provide feedback to the multi-sensor fusion platform 432 to create templates, patterns and control scenarios. These are based on successful actions or may be based on poor results, where the multi-sensor fusion platform 432 learns from past actions.

Data from the sensors 402-422 may be combined in the multi-sensor fusion platform 432 to improve the target detection and identification performance of autonomous driving system 400. The multi-sensor fusion platform 432 may itself be controlled by the system controller 424, which may also interact with and control other modules and systems in the ego vehicle. For example, the system controller 424 may power on or off the different sensors 402-422 as desired, or provide instructions to the ego vehicle to stop upon identifying a driving hazard (e.g., deer, pedestrian, cyclist, or another vehicle suddenly appearing in the vehicle's path, flying debris, etc.)

All modules and systems in the autonomous driving system 400 communicate with each other through the communication module 430. The system memory 426 may store information and data (e.g., static and dynamic data) used for operation of the autonomous driving system 400 and the ego vehicle using the autonomous driving system 400. The V2V communications module 430 is used for communication with other vehicles, such as to obtain information from other vehicles that is non-transparent to the user, driver, or rider of the ego vehicle, and to help vehicles coordinate with one another to avoid any type of collision.

A challenge in the detection and identification of objects with autonomous driving system 400 is in the training of the neural networks coupled to the beam steering radar sensors 402-404. Training of neural networks for object recognition tasks often requires considerable data and reliable training sets having labeled data. As the beam steering radar data is in the form of range-doppler maps ("RDMs") with range and velocity information but no apparent features or characteristics of objects, labelling of the data is not an intuitive task.

Figure 5:
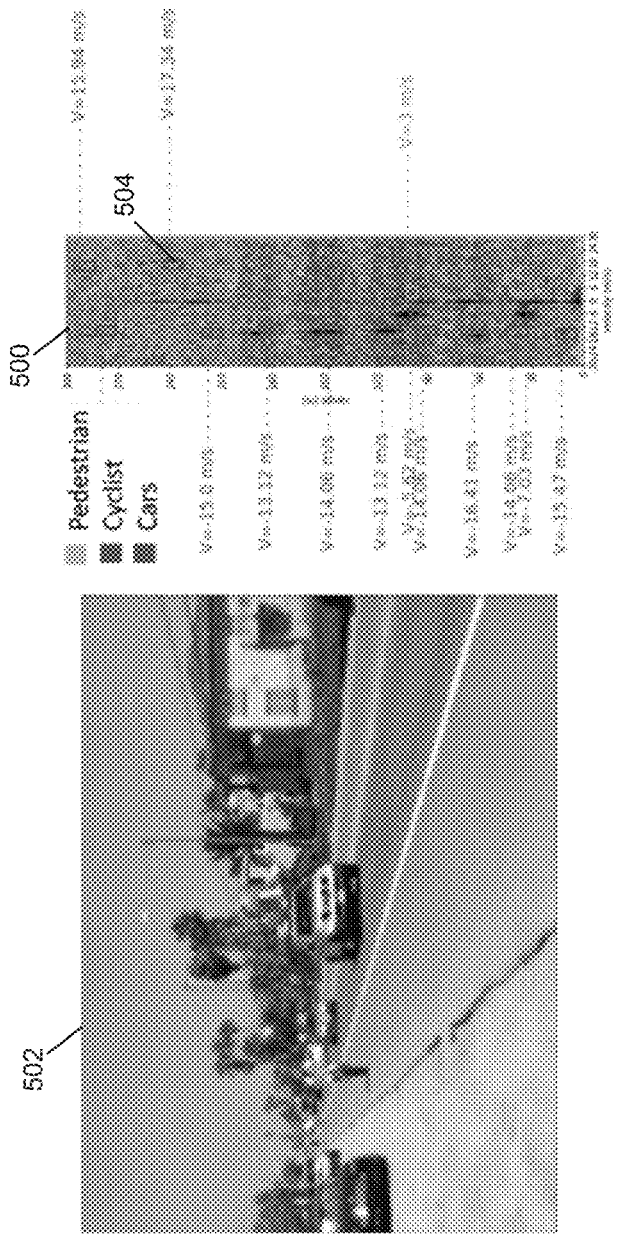
FIG. 5 illustrates an example range-doppler map captured by a beam steering radar system as in FIG. 3 for an outdoor scene and in accordance with one or more implementations of the subject technology.

FIG. 5 illustrates a range-doppler map captured by a beam steering radar such as beam steering radars 402-404. Beam steering radars 402-404 are able to capture data relating to the cars, pedestrians and cyclists in the scene 502, whether in movement or stationary. For ease of understanding, the objects detected in scene 502 are shown in the range-doppler map with bounded boxes. e.g., bounded box 504. Initially, however, all data acquired by the radars 402-404 is in the form of unlabeled data. The RDMs display only the range and velocity information of detected objects on a x-y axis, with objects appearing as a cluster of similar intensity pixels. As such, these unlabeled RDMs do not indicate the category of the objects detected. There is no intuitive way of knowing which objects appear on an unlabeled RDM or even which pixels in the RDM correspond to detected objects.

Figure 6:
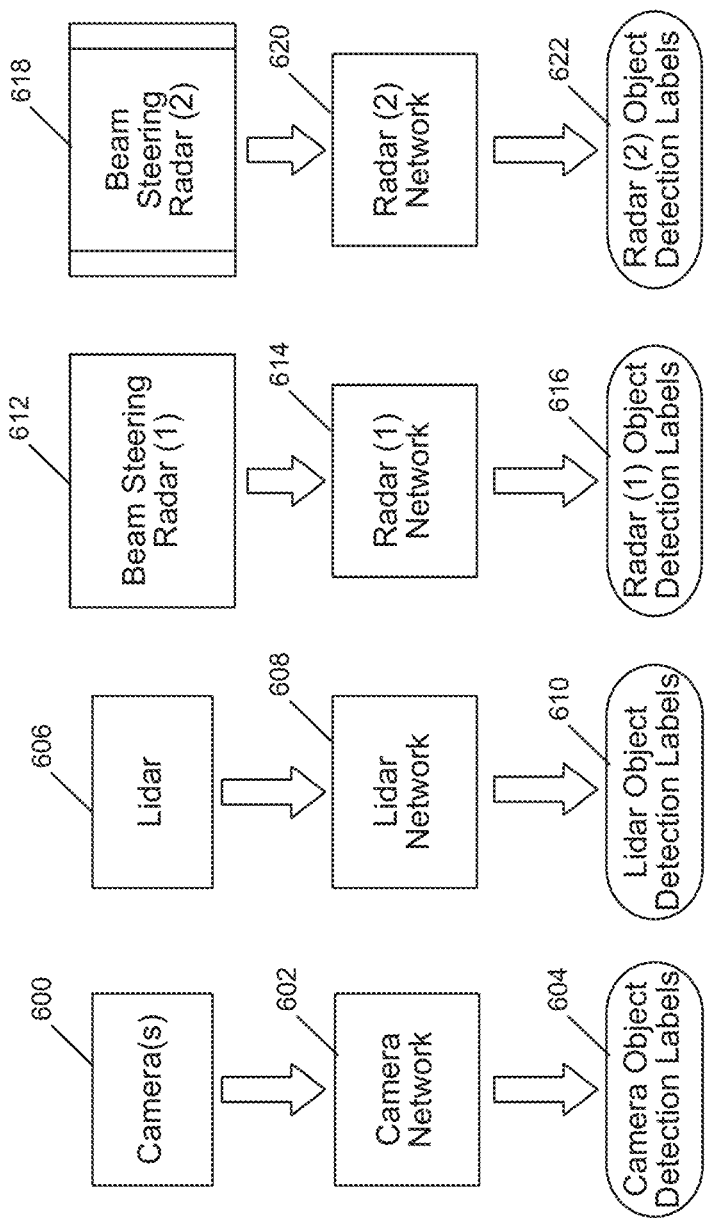
FIG. 6 is a schematic diagram illustrating various sensors and their perception engine networks in accordance with one or more implementations.

In order to properly identify objects in RDMs generated by a beam steering radar described herein, the perception engine coupled to the radar may be initially trained with labeled data from lidar and camera sensors. FIG. 6 illustrates various sensors and their perception engine networks in accordance with one or more implementations. Data from camera 600 is fed into a camera network 602 for generating camera object detection labels 604. Similarly, data from lidar 606 is fed into a lidar network 608 for generating lidar object detection labels 610. The labeled data from camera 600 and lidar 606 is created from data acquired during actual driving conditions on various roads, time of day and weather patterns. Initially, human observers may label the data to train camera network 602 and lidar network 608 to identify objects in the data. Once the networks 602 and 608 are trained, the generated camera object detection labels 604 and lidar object detection labels 610 may be used in the training of radar network 614 for labeling data from beam steering radar 612.

As described herein below, there may be multiple beam steering radars with different characteristics, configurations and scan patterns deployed in a vehicle. Once a preliminary training of the first beam steering radar 612 is performed, training of the first beam steering radar 612 may occur during the training of camera 600 and lidar 604 on actual driving conditions. In some embodiments, training of the first beam steering radar 612 may occur in parallel with the training of camera 600 and lidar 604 on actual driving conditions. The first set of radar object detection labels 616 may be used to train a GAN to generate a synthesized training set to train a second beam steering radar network 620 for a second beam steering radar 618 with differing characteristics from the first beam steering radar 612. Note that this facilitates deployment of the second beam steering radar 618 as its training can be performed in advance of deployment by leveraging the training of the first beam steering radar 612.

Figure 7:
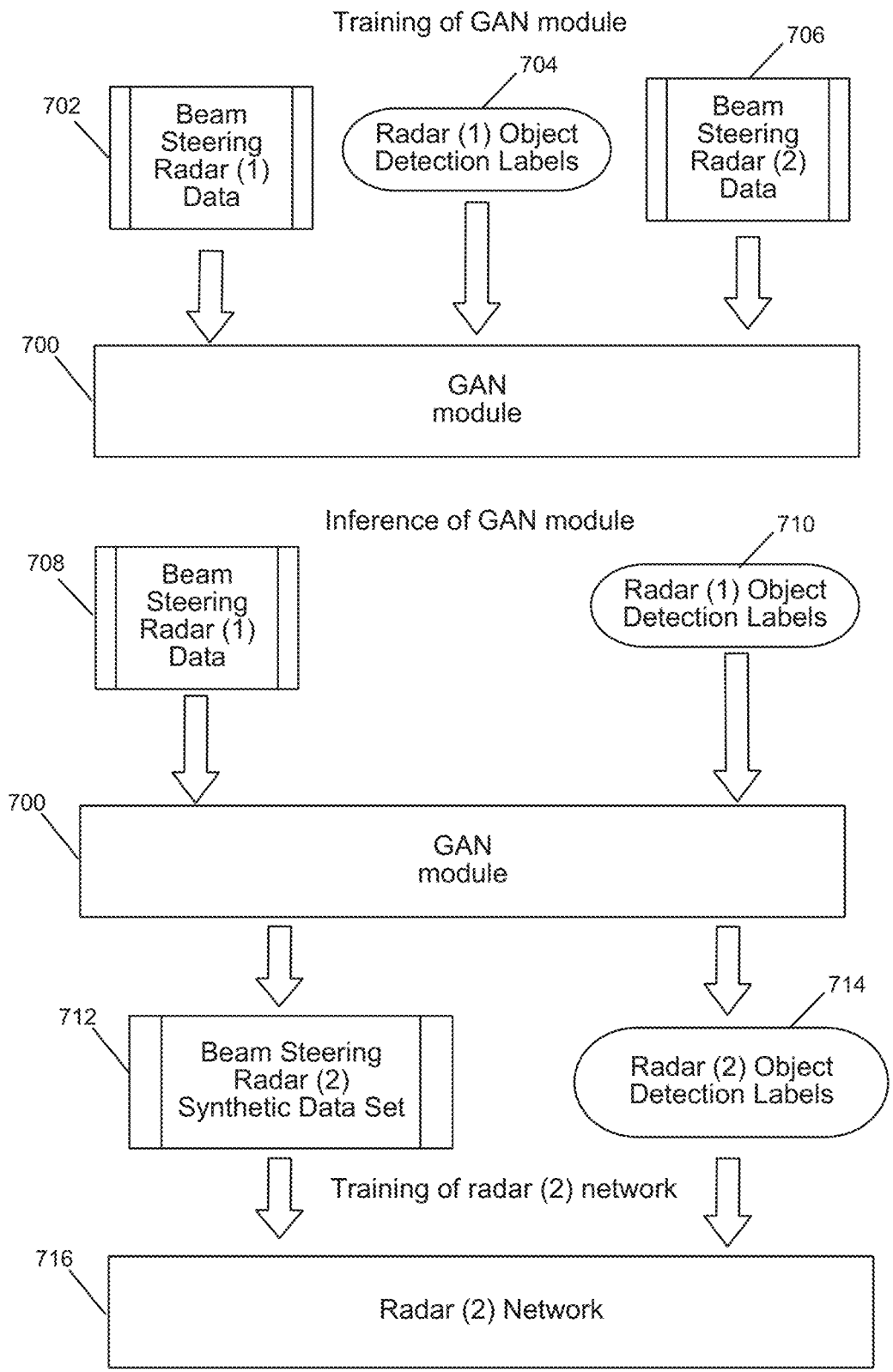
FIG. 7 is a schematic diagram illustrating a system for training a second beam steering radar from a first beam steering radar in accordance with one or more implementations of the subject technology.

FIG. 7 illustrates a system for training a second beam steering radar from a first beam steering radar in more detail. In various examples, the training of a second beam steering radar from a first beam steering radar is accomplished by implementing a GAN module 700. A GAN is a combination of two recurrent neural networks that can generate a new, synthetic instance of data that can pass for real data: a generative network for the raw radar data and a discriminative network for estimating the probability that a labeled data set is in fact real data. The generative network generates new data instances while the discriminative network decides whether the labels that it reviews belong to the actual training data set. Over time, the two networks become more accurate in producing a synthetic training data set that appears authentic.

Training of the GAN module 700 proceeds in alternating periods, with the discriminative network being trained in one period to learn how to distinguish real data from fake data and the generative network being trained in a second period to learn how to generate better instances of data. The discriminative network takes in both real data and fake data and outputs probabilities with a number between 0 and 1, with 1 representing a prediction of authenticity as real data and 0 representing fake data. In accordance with some embodiments, the discriminative network is a binary classifier that outputs real data as 1 and fake data as 0 As for example, real data is data that acquired from a beam steering radar whereas fake data can be any generated set of data, which can be random or simulated real-time acquired data, that is fed into the discriminative network to train the GAN module. The real data fed into the GAN module 700 comes from the first beam steering radar that has already been trained. i.e., data 702 and its corresponding object detection labels 704. The GAN module 700 must learn how to distinguish this real data from fake data, which initially can be a random data set or a small data set 704 from the second beam steering radar. Once the GAN module 700 is trained, it is ready to generate a synthetic data set for the second beam steering radar. The synthetic data set is composed of data set 712 and corresponding labels 714, generated during inference from actual data from the first beam steering radar, that is, generated from data set 708 and its corresponding labels 710. The synthetic data set 712-714 is used to train radar network 716 for the second beam steering radar, which can then be deployed in an ego vehicle to detect and identify objects on the fly. Note that implementing the GAN module 700 enables the use of two beam steering radars with different characteristics while saving time and computational resources to train them. The first beam steering radar is trained to then facilitate and speed up the training of the second beam steering radar.

Figure 8:
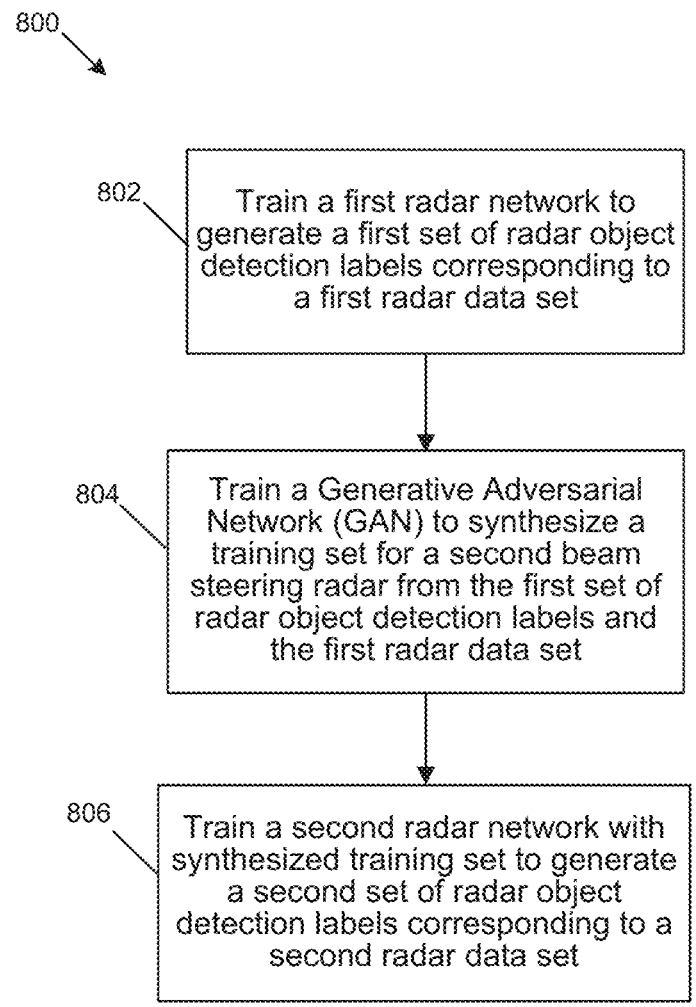
FIG. 8 is a flowchart for a GAN-based data synthesis for semi-supervised learning of a radar sensor in accordance with one or more implementations of the subject technology.

A flow chart illustrating this process is shown in FIG. 8, in accordance with various implementations of the subject technology. As illustrated in FIG. 8, a first radar network is trained to generate a first set of radar object detection labels corresponding to a first radar data set (802). Once the first beam steering radar is trained, a GAN is trained to synthesize a training set for a second beam steering radar from the first set of radar object detection labels and the first radar data set (804). The synthesized training set is then used to generate a second set of radar object detection labels identifying objects corresponding to a second radar set detected by the second beam steering radar (806).

Figure 9:
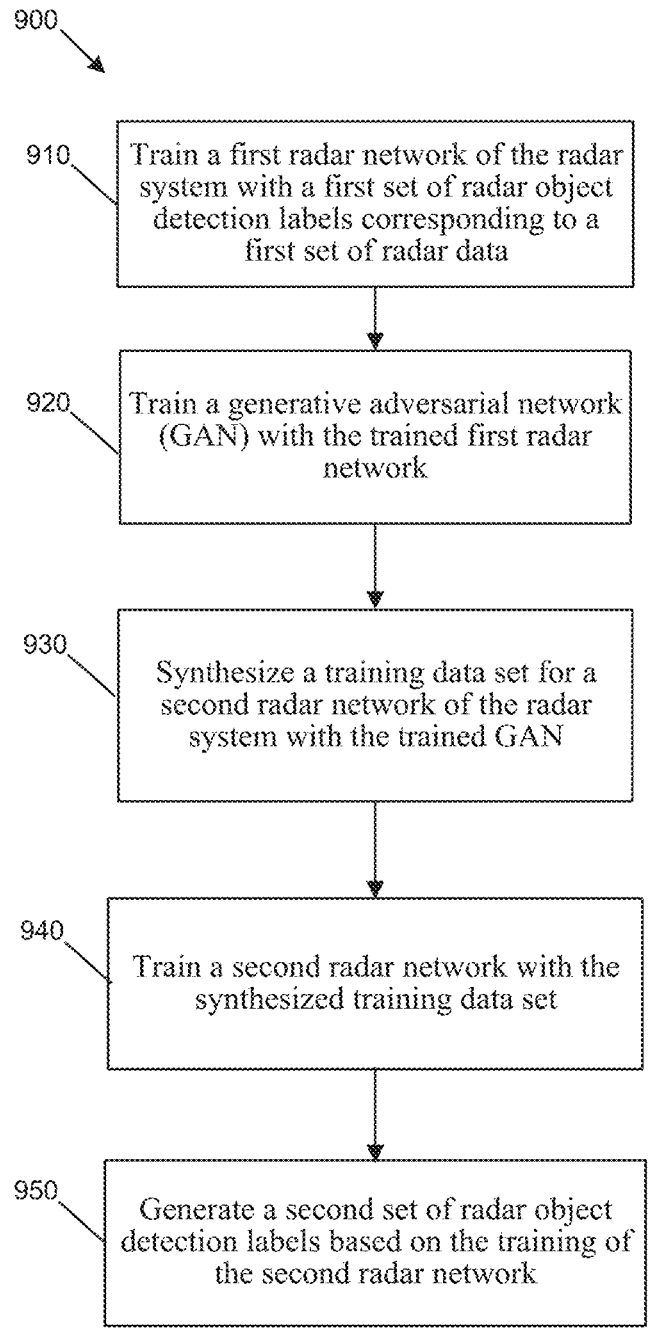
FIG. 9 is a flowchart for a method for semi-supervised training of a radar system in accordance with various implementations of the subject technology.

FIG. 9 is a flowchart for a method 900 for semi-supervised training of a radar system in accordance with various implementations of the subject technology. For explanatory purposes, the method 900 of FIG. 9 is described herein with reference to various radar systems and platforms described with respect to FIGS. 1-7: however, the method 900 is not limited to the such platforms and the radar systems.

As illustrated in FIG. 9, the method 900 includes training a first radar network of the radar system, at step 910. The first radar network can be configured to provide a first set of radar object detection labels corresponding to a first set of radar data. In accordance with various embodiments herein, the first set of radar data can be acquired via one or more of lidar or camera sensors of the radar system. This can be done during an actual driving condition that occurs on a plurality of roads, at various times of the day for one or more days, or under various weather patterns. The one or more of lidar and/or camera sensors and the beam steering radar are components in an autonomous vehicle. The autonomous vehicle may further include additional components or modules as described herein. In some embodiments, the radar system includes one or more beam steering radars as disclosed herein.

At step 920, the method 900 includes training a generative adversarial network (GAN) with the trained first radar network. As described herein, the GAN or GAN module is a neural network that can be configured to distinguish real data from fake data as described above with respect to FIGS. 6 and 7. In various implementations, the real data can comprise the first set of radar data obtained during actual driving conditions that is acquired via one or more of lidar or camera sensors of the radar system. In various embodiments, the GAN or GAN module can include a combination of a generative network and a discriminative network. In accordance with various embodiments, the generative network can be configured for generating new data instances based on the first set of radar data and the discriminative network can be configured to distinguish the new data instances from the fake data.

The method 900 includes, at step 930, synthesizing a training data set for a second radar network of the radar system with the trained GAN. In various implementations, the synthesized training data set can comprise a data set and corresponding labels of the data set that are generated during inference from the first set of radar and the first set of radar object detection labels, as described above with respect to FIGS. 6 and 7.

At step 940, the method 900 includes training a second radar network with the synthesized training data set. In various embodiments, the first radar network includes a first beam steering radar and the second radar network includes a second beam steering radar. In various implementations, the first beam steering radar and the second beam steering radar can have different characteristics in at least one of a configuration of parameters or a scan pattern. In various implementations, the training of the second radar network by the GAN is performed prior to deployment of the second beam steering radar on an autonomous vehicle.

At step 950, the method 900 includes generating a second set of radar object detection labels based on the training of the second radar network. In addition, the method 900 may optionally include training one or more of lidar or camera sensors on actual driving conditions, wherein the training of the one or more of lidar or camera sensors occurs during the training of the first radar network of the radar system. In accordance with various implementations and embodiments herein, any of the methods or processes described with respect to FIGS. 6-8 can be included in the method 900 as described with respect to FIG. 9.

Figure 10:
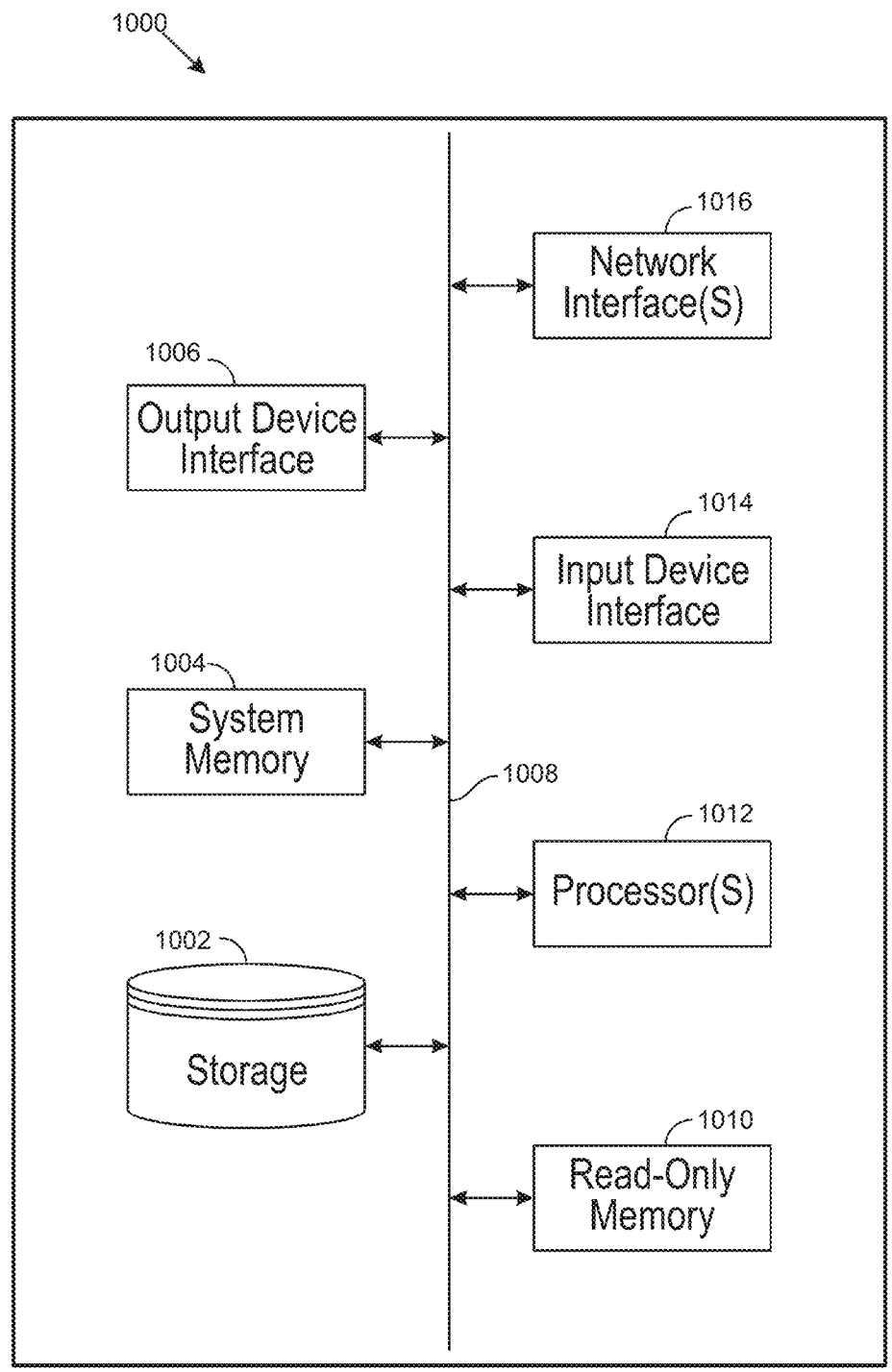
FIG. 10 conceptually illustrates an electronic system with which one or more embodiments of the subject technology may be implemented.

FIG. 10 conceptually illustrates an electronic system 1000 with which one or more embodiments of the subject technology may be implemented. For example, each of the perception engines, including but not limited to, for example, a radar perception engine, a camera perception engine, and a lidar perception engine, along with their respective neural networks, including but not limited to, for example, a radar neural network, a camera neural network, and a lidar neural network, may be implemented via the electronic system 1000 or via any of the components within the electronic system 1000. In addition, the electronic system 1000 or any of the components within the electronic system 1000 can be configured to process any of methods 800 or 900 to perform the various method or process steps in their respective methods, including, for example, but not limited to method or process steps related to training, retraining, generating, regenerating, accessing, and acquiring.

As illustrated in FIG. 10, the electronic system 1000, for example, can be a computer, a server, or generally any electronic device that executes a program. Such an electronic system includes various types of computer readable media and interfaces for various other types of computer readable media. The electronic system 1000 includes a bus 1008, one or more processing unit(s) 1012, a system memory 1004 (and/or buffer), a read-only memory (ROM) 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. For example, the processing unit(s) 1012 can execute instructions that perform one or more processes, such as from methods 800 and 900. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as a random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback: and input from the user can be received in any form, including acoustic, speech, or tactile input.

Finally, as shown in FIG. 10, the bus 1008 also couples the electronic system 1000 to a network (not shown) and/or to one or more devices through the one or more network interface(s) 1016, such as one or more wireless network interfaces. In this manner, the electronic system 1000 can be a part of a network of computers (such as a local area network ("LAN"), a wide area network ("WAN"), or an Intranet, or a network of networks, such as the Internet. Any or all components of the electronic system 1000 can be used in conjunction with the subject disclosure.

In accordance with various embodiments, a method for semi-supervised training of a radar system is described. The method for semi-supervised training of a radar system includes training a first radar network of the radar system with a first set of radar object detection labels corresponding to a first set of radar data: training a generative adversarial network (GAN) with the trained first radar network: synthesizing a training data set for a second radar network of the radar system with the trained GAN: training a second radar network with the synthesized training data set: and generating a second set of radar object detection labels based on the training of the second radar network.

In various embodiments, the first set of radar data is acquired via one or more of lidar or camera sensors of the radar system during an actual driving condition that occurs on a plurality of roads at various times with various weather patterns for one or more days. In various embodiments, the method may optionally include training one or more of lidar or camera sensors on actual driving conditions, wherein the training of the one or more of lidar or camera sensors occurs during the training of the first radar network of the radar system.

In various embodiments, the synthesized training data set includes a data set and corresponding labels that are generated during an inference from the first set of radar and the first set of radar object detection labels. In various embodiments, the GAN is a neural network configured to distinguish real data from fake data, wherein the real data comprises the first set of radar data obtained during actual driving conditions acquired via one or more of lidar or camera sensors of the radar system. In various embodiments, the GAN includes a combination of a generative network and a discriminative network. In some embodiments, the generative network is configured for generating new data instances based on the first set of radar data and the discriminative network is configured to distinguish the new data instances from the fake data.

In various embodiments, the first radar network includes a first beam steering radar and the second radar network includes a second beam steering radar. In various embodiments, the first beam steering radar and the second beam steering radar have different characteristics in at least one of a configuration of parameters or a scan pattern. In various embodiments, the training of the second radar network by the GAN is performed prior to deployment of the second beam steering radar.

In accordance with various embodiments, a system for training a radar or a radar system is disclosed. The system includes a first radar network that provides a first set of radar object detection labels corresponding to a first set of radar data: a second radar network: and a GAN module configured to train the second radar network using the first set of radar object detection labels and the first set of radar data.

In various embodiments, the first set of radar data is acquired via one or more of lidar or camera sensors of the radar during an actual driving condition that occurs on a plurality of roads at various times with various weather patterns for one or more days. In various embodiments, the GAN module can include a neural network configured to distinguish real data from fake data, wherein the real data comprises the first set of radar data obtained during actual driving conditions acquired via one or more of lidar or camera sensors of the radar. In various embodiments, the GAN module can include a combination of a generative network and a discriminative network, wherein the generative network is configured for generating new data instances based on the first set of radar data and the discriminative network is configured to distinguish the new data instances from the fake data. In various embodiments, the GAN module is configured to synthesize a training set for the second radar network of the radar using the first set of radar object detection labels and the first set of radar data.

In various embodiments, the first radar network comprises a first beam steering radar and the second radar network comprises a second beam steering radar, wherein the first beam steering radar and the second beam steering radar have different characteristics in at least one of a configuration of parameters or a scan pattern. In various embodiments, the second radar network is trained with the GAN module prior to deployment of the second beam steering radar.

In accordance with various embodiments, a non-transitory computer readable medium is disclosed. The medium includes computer executable instructions stored thereon to cause one or more processing units to train a first radar network of a radar system with a first set of radar object detection labels corresponding to a first set of radar data: train a generative adversarial network (GAN) with the trained first radar network: synthesize a training data set for a second radar network of the radar system with the trained GAN: train a second radar network with the synthesized training data set: and generate a second set of radar object detection labels based on the training of the second radar network.

In various embodiments, the first set of radar data is acquired via one or more of lidar or camera sensors of the radar system during an actual driving condition that occurs on a plurality of roads at various times with various weather patterns for one or more days. In various embodiments, the medium includes further instructions to cause one or more processing units to train one or more of lidar or camera sensors on actual driving conditions, wherein the training of the one or more of lidar or camera sensors occurs during the training of the first radar network of the radar system.

In various embodiments, the GAN is a neural network configured to distinguish real data from fake data, wherein the GAN comprises a combination of a generative network and a discriminative network, wherein the generative network is configured for generating new data instances based on the first set of radar data and the discriminative network is configured to distinguish the new data instances from the fake data.

In various embodiments, the first radar network comprises a first beam steering radar and the second radar network comprises a second beam steering radar, wherein the first beam steering radar and the second beam steering radar have different characteristics in at least one of a configuration of parameters or a scan pattern, and wherein the training of the second radar network by the GAN is performed prior to deployment of the second beam steering radar.

It is appreciated that the beam steering radar described herein above supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

The previous description of the disclosed examples is provided to enable any person skilled in the art to make or use the present disclosure. Various modifications to these examples will be readily apparent to those skilled in the art, and the m spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item: rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C: any combination of A, B, and C: and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A method for semi-supervised training of a radar system, comprising:
   training a first radar network of the radar system with a first set of radar object detection labels corresponding to a first set of radar data;
   training a generative adversarial network (GAN) with the trained first radar network;
   synthesizing a training data set for a second radar network of the radar system with the trained GAN;
   training the second radar network with the synthesized training data set; and
   generating a second set of radar object detection labels based on the training of the second radar network.

2. The method of claim 1, wherein the first set of radar data is acquired via one or more of lidar or camera sensors of the radar system during an actual driving condition that occurs on a plurality of roads at various times with various weather patterns for one or more days.

3. The method of claim 1, further comprising:
training one or more of lidar or camera sensors on actual driving conditions, wherein the training of the one or more of lidar or camera sensors occurs during the training of the first radar network of the radar system.

4. The method of claim 1, wherein the synthesized training data set comprises a data set and corresponding labels that are generated during an inference from the first set of radar data and the first set of radar object detection labels.

5. The method of claim 1, wherein the GAN is a neural network configured to distinguish real data from fake data, wherein the real data comprises the first set of radar data obtained during actual driving conditions acquired via one or more of lidar or camera sensors of the radar system.

6. The method of claim 5, wherein the GAN comprises a combination of a generative network and a discriminative network, wherein the generative network is configured for generating new data instances based on the first set of radar data and the discriminative network is configured to distinguish the new data instances from the fake data.

7. The method of claim 1, wherein the first radar network comprises a first beam steering radar and the second radar network comprises a second beam steering radar, wherein the first beam steering radar and the second beam steering radar have different characteristics in at least one of a configuration of parameters or a scan pattern.

8. The method of claim 7, wherein the training of the second radar network by the GAN is performed prior to a deployment of the second beam steering radar.

9. A system for training a radar, comprising:
a first radar network that provides a first set of radar object detection labels corresponding to a first set of radar data;
a generative adversarial network (GAN) module trained with the first radar network;
a second radar network; and
the GAN module configured to train the second radar network using the first set of radar object detection labels and the first set of radar data.

10. The system of claim 9, wherein the first set of radar data is acquired via one or more of lidar or camera sensors of the radar during an actual driving condition that occurs on a plurality of roads at various times with various weather patterns for one or more days.

11. The system of claim 9, wherein the GAN module comprises a neural network configured to distinguish real data from fake data, wherein the real data comprises the first set of radar data obtained during actual driving conditions acquired via one or more of lidar or camera sensors of the radar.

12. The system of claim 11, wherein the GAN module comprises a combination of a generative network and a discriminative network, wherein the generative network is configured for generating new data instances based on the first set of radar data and the discriminative network is configured to distinguish the new data instances from the fake data.

13. The system of claim 9, wherein the GAN module is configured to synthesize a training set for the second radar network of the radar using the first set of radar object detection labels and the first set of radar data.

14. The system of claim 9, wherein the first radar network comprises a first beam steering radar and the second radar network comprises a second beam steering radar, wherein the first beam steering radar and the second beam steering radar have different characteristics in at least one of a configuration of parameters or a scan pattern.

15. The system of claim 14, wherein the second radar network is trained with the GAN module prior to a deployment of the second beam steering radar.

16. A non-transitory computer readable medium comprising computer executable instructions stored thereon to cause one or more processing units to:
train a first radar network of a radar system with a first set of radar object detection labels corresponding to a first set of radar data;
train a generative adversarial network (GAN) with the trained first radar network; synthesize a training data set for a second radar network of the radar system with the trained GAN;
train the second radar network with the synthesized training data set; and
generate a second set of radar object detection labels based on the training of the second radar network.

17. The non-transitory computer readable medium of claim 16, wherein the first set of radar data is acquired via one or more of lidar or camera sensors of the radar system during an actual driving condition that occurs on a plurality of roads at various times with various weather patterns for one or more days.

18. The non-transitory computer readable medium of claim 16, wherein the instructions further cause the one or more processing units to:
train one or more of lidar or camera sensors on actual driving conditions, wherein the training of the one or more of lidar or camera sensors occurs during the training of the first radar network of the radar system.

19. The non-transitory computer readable medium of claim 16, wherein the GAN is a neural network configured to distinguish real data from fake data, wherein the GAN comprises a combination of a generative network and a discriminative network, wherein the generative network is configured for generating new data instances based on the first set of radar data and the discriminative network is configured to distinguish the new data instances from the fake data.

20. The non-transitory computer readable medium of claim 16, wherein the first radar network comprises a first beam steering radar and the second radar network comprises a second beam steering radar, wherein the first beam steering radar and the second beam steering radar have different characteristics in at least one of a configuration of parameters or a scan pattern, and wherein the training of the second radar network by the GAN is performed prior to deployment of the second beam steering radar.

* * * * *